United States Patent
Goyanko (10) Patent No.: US 7,513,730 B2
(45) Date of Patent: Apr. 7, 2009

(54) MOTORIZED LOADER RACK FOR VEHICLE ROOF

(76) Inventor: Jess C. Goyanko, 5546 Jowett Ct., Alexandria, VA (US) 22315

( * ) Notice: Subject to any disclaimer, the term of this patent is extended or adjusted under 35 U.S.C. 154(b) by 258 days.

(21) Appl. No.: 11/527,455

(22) Filed: Sep. 27, 2006

(65) Prior Publication Data

US 2007/0175936 A1    Aug. 2, 2007

Related U.S. Application Data

(60) Provisional application No. 60/724,909, filed on Oct. 11, 2005.

(51) Int. Cl.
  *B60P 9/00* (2006.01)
  *B60R 9/00* (2006.01)
  *B60R 9/042* (2006.01)

(52) U.S. Cl. .................... 414/462; 224/310

(58) Field of Classification Search ............... 182/88, 182/91; 211/115–117, 122, 151, 187, 90.01; 224/309–310, 324, 401, 522; 312/322–323; 414/462, 541–542, 549, 556
See application file for complete search history.

(56) References Cited

U.S. PATENT DOCUMENTS

| 2,828,035 | A |   | 3/1958  | Kuchinskie     | 214/450 |
|-----------|---|---|---------|----------------|---------|
| 3,495,729 | A | * | 2/1970  | Kruse          | 414/462 |
| 3,534,892 | A | * | 10/1970 | Truelove, Sr.  | 224/311 |
| 3,833,240 | A | * | 9/1974  | Weiler         | 280/166 |
| 4,245,947 | A |   | 1/1981  | Clement        | 414/462 |
| 4,339,223 | A | * | 7/1982  | Golze          | 414/462 |
| 4,757,929 | A | * | 7/1988  | Nelson         | 224/329 |
| 5,346,355 | A | * | 9/1994  | Riemer         | 414/542 |
| 5,423,650 | A | * | 6/1995  | Zerbst et al.  | 414/462 |
| 5,850,891 | A |   | 12/1998 | Olms           | 182/127 |
| 5,988,470 | A | * | 11/1999 | Siciliano      | 224/310 |
| 6,360,930 | B1|   | 3/2002  | Flickenger     | 224/310 |
| 6,638,000 | B2|   | 10/2003 | Groves         | 414/462 |
| 6,874,835 | B1| * | 4/2005  | Silverness     | 296/3   |
| 2004/0131455 | A1 | * | 7/2004 | Henderson  | 414/462 |
| 2005/0079036 | A1 |   | 4/2005 | Richter    | 414/462 |

* cited by examiner

*Primary Examiner*—Gregory W Adams
(74) *Attorney, Agent, or Firm*—Richard C. Litman (57) ABSTRACT

The rack for a vehicle roof is a mechanized device for loading and unloading cargo onto and from a roof of a motor vehicle for transport. The rack includes a pair of horizontal support frame members mounted either directly on the roof of the vehicle, or onto an existing vehicle roof rack. A cargo carrying rack is mounted on cargo carrying arms, which are pivotally and slidably attached to a pair of traveling support arms that are, in turn, pivotally and slidably linked to the frame members. In some embodiments, a motor and gear train raise and lower the cargo carrying rack to and from the roof for loading and unloading cargo. In other embodiments, the cargo carrying rack is raised and lowered manually, with articulated stabilizer arms having a ratchet mechanism at one end and a spring-biased pulley at the other end dampening the speed of deployment.

9 Claims, 8 Drawing Sheets

MOTORIZED LOADER RACK FOR VEHICLE ROOF

CROSS-REFERENCE TO RELATED APPLICATION

This application claims the benefit of U.S. Provisional Patent Application Ser. No. 60/724,909, filed Oct. 11, 2005.

BACKGROUND OF THE INVENTION

1. Field of the Invention

The present invention relates to an accessory for a motor vehicle, and particularly to a rack for a vehicle roof for transporting articles, such as ladders or bicycles, on the roof of a vehicle.

2. Description of the Related Art

People often use ordinary passenger cars or vans to transport articles that are too large to fit in the passenger compartment or interior of the vehicle. In order to facilitate such transport, many passenger vehicles and vans are equipped with a roof rack, either as optional original equipment or as an aftermarket accessory. Roof racks are commonly used to transport such large or bulky items as ladders, kayaks, bicycles, luggage, etc. The usual procedure involves manually lifting the item onto the rack and securing it with straps, cords, brackets, and the like.

Many of the items transported in this manner are so large and bulky that more than one person is required to lift and manipulate the article into proper position on the rack. Even with multiple persons participating in the process, loading and unloading of such articles may be enervating, as it may require supporting heavy items above one's head for significant periods of time. While the process can ordinarily be accomplished with sufficient effort by those in relatively good condition, it may prove to be a daunting task for those with physical handicaps.

Thus, a rack for a vehicle roof solving the aforementioned problems is desired.

SUMMARY OF THE INVENTION

The rack for a vehicle roof is a mechanized device for loading and unloading cargo onto and from a roof of a motor vehicle for transport. The rack includes a pair of horizontal support frame members mounted either directly on the roof of the vehicle, or onto an existing vehicle roof rack. A cargo carrying rack is mounted on cargo carrying arms, which are pivotally and slidably attached to a pair of traveling support arms that are, in turn, pivotally and slidably linked to the frame members. In some embodiments, a motor and gear train raise and lower the cargo carrying rack to and from the roof for loading and unloading cargo. In other embodiments, the cargo carrying rack is raised and lowered manually, with articulated stabilizer arms having a ratchet mechanism at one end and a spring-biased pulley at the other end dampening the speed of deployment.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
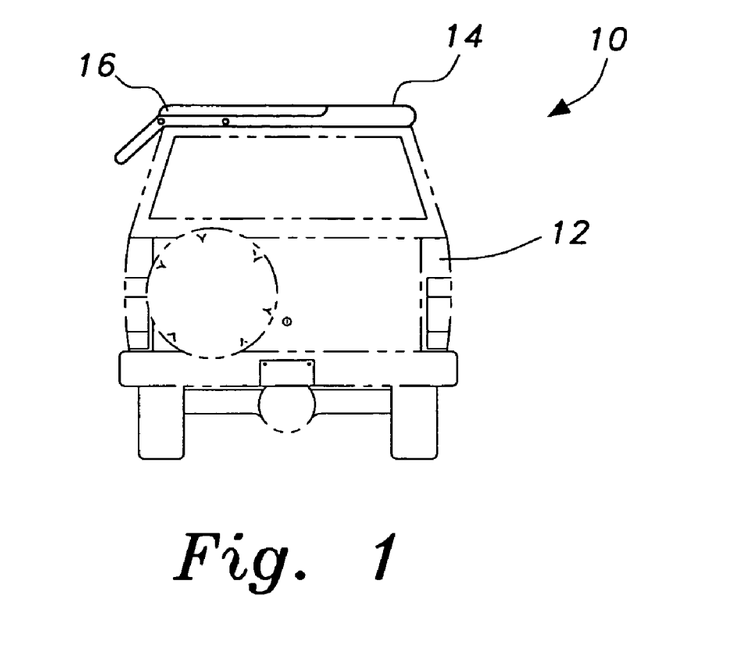
FIG. 1 is an environmental rear view of a motorized rack for a vehicle roof, showing the motorized rack in a collapsed position.
Figure 2:
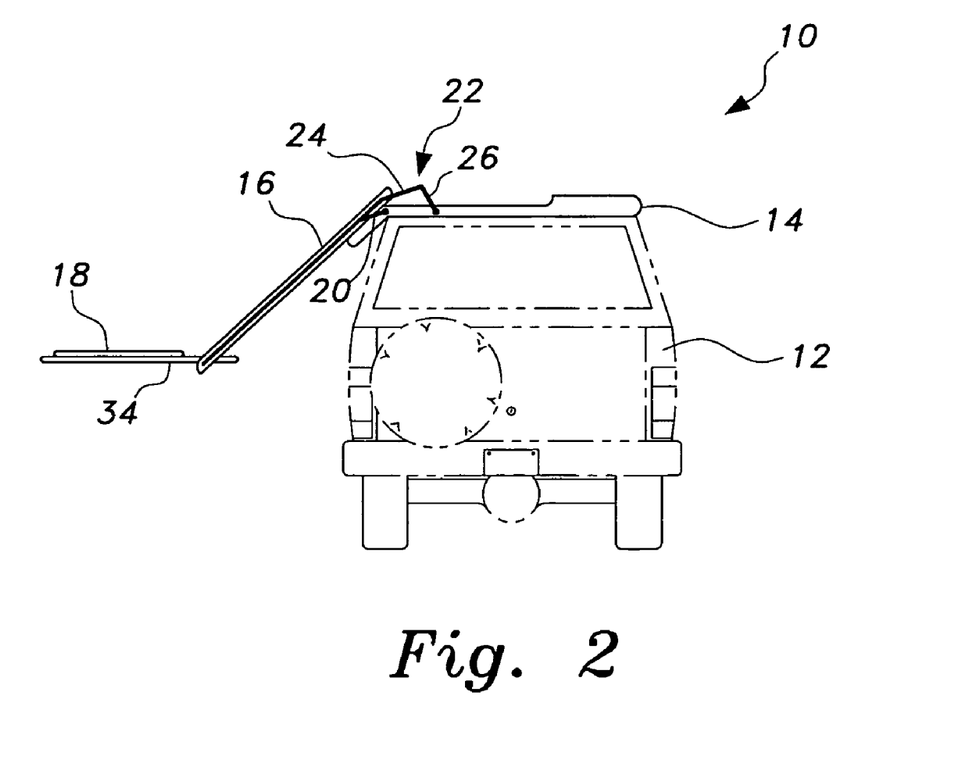
FIG. 2 is an environmental rear view of the motorized rack of FIG. 1 with the motorized rack in a deployed position.

Referring now to FIGS. 1-6, there is shown various embodiments of a rack for a vehicle roof, designated generally as 10 in the drawings, that are motorized for allowing easy and efficient loading and transport of equipment, such as bicycles, ladders, luggage, and other cargo on the roof of a vehicle 12. In FIGS. 1 and 2, vehicle 12 is illustrated as a van; however, it should be understood that the motorized rack 10 may be mounted on any type of vehicle including, but not limited to, cars, trucks and vans.

FIG. 1 illustrates the motorized rack 10 mounted on vehicle 12 with the motorized rack 10 being shown in a collapsed position. The motorized rack 10 includes a pair of horizontal support frame members 14, which are attached directly to the roof of the vehicle 12. Alternatively, the motorized rack 10 may be secured to a pre-installed equipment carrier, such as roof racks commonly mounted on the roofs of vehicles for the storage of skis. FIG. 1 illustrates the motorized rack mounted directly to the vehicle's roof and secured thereto by any method conventional in the art, such as bolts or by welding. It should be understood that any suitable method may be utilized for attaching the motorized rack directly to the roof of the vehicle, or to a pre-existing roof rack.

Traveling support arms 16 are pivotally and releasably mounted to horizontal support frame members 14 and engage the horizontal support frame members 14 to achieve the compact collapsed configuration illustrated in FIG. 1. As shown in FIGS. 1 and 2, horizontal support frame members 14 are contoured to each form a recess to receive and engage a corresponding one of traveling support arms 16, thus minimizing the overall volume of the motorized rack 10 and lowering the overall height of the vehicle when no cargo is loaded.

As shown in FIGS. 1 and 2, the support frame members 14 are rails having a horizontal recess formed along one end (shown to the left in FIGS. 1 and 2) for receiving traveling support arms 16 in a compact, nested relationship. One end of each support frame member 14 is angled downwardly to form an overhang on one side of vehicle 12. This angled overhang, as will be described below, provides support for arm 16 when arm 16 is in the extended position.

FIG. 2 illustrates the motorized rack 10 in an expanded configuration with horizontal rack arms 16 extended to lower the cargo carrying member for loading or unloading. First pivotal arm members 20 and second pivotal arm members 22, best shown in FIG. 5B, extend from each of the horizontal support frame members 14 and engage the corresponding traveling support arms 16. Arm members 20 and 22 provide support and control for the traveling support arms 16 and, as described below, allow for the controlled deployment of the traveling support arms 16. The deployment of traveling support arms 16 is motor driven and carefully controlled. Cargo carrier arms 34 deploy horizontally, as best shown in FIGS. 4 and 5A, and cargo carrying rack 18 is mounted on cargo carrier arms 34 for receiving equipment.

Figure 3:
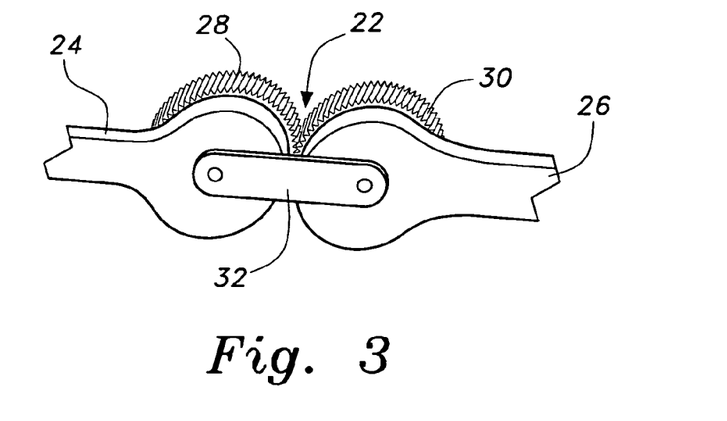
FIG. 3 is a perspective view of a pivoting arm member of the motorized rack of the present invention.

FIG. 3 is an expanded view of the central pivoting portion of the second pivoting arm member 22. As further shown in FIGS. 4 and 5B, the arm member 22 includes an upper rod 24, which engages the traveling support arm 16 at one end, and further includes a lower rod 26, which engages the horizontal support frame member 14 at one end. The upper rod 24 includes a gear head 28 formed at the end opposite traveling support arm 16, the gear head 28 engaging a similar gear head 30 of lower rod 26. Gear heads 28 and 30 are held in engagement by a pair of opposing brackets 32. This allows for the controlled, articulated motion of arm member 22 as the traveling support arm 16 is deployed and retracted.

Figure 4:
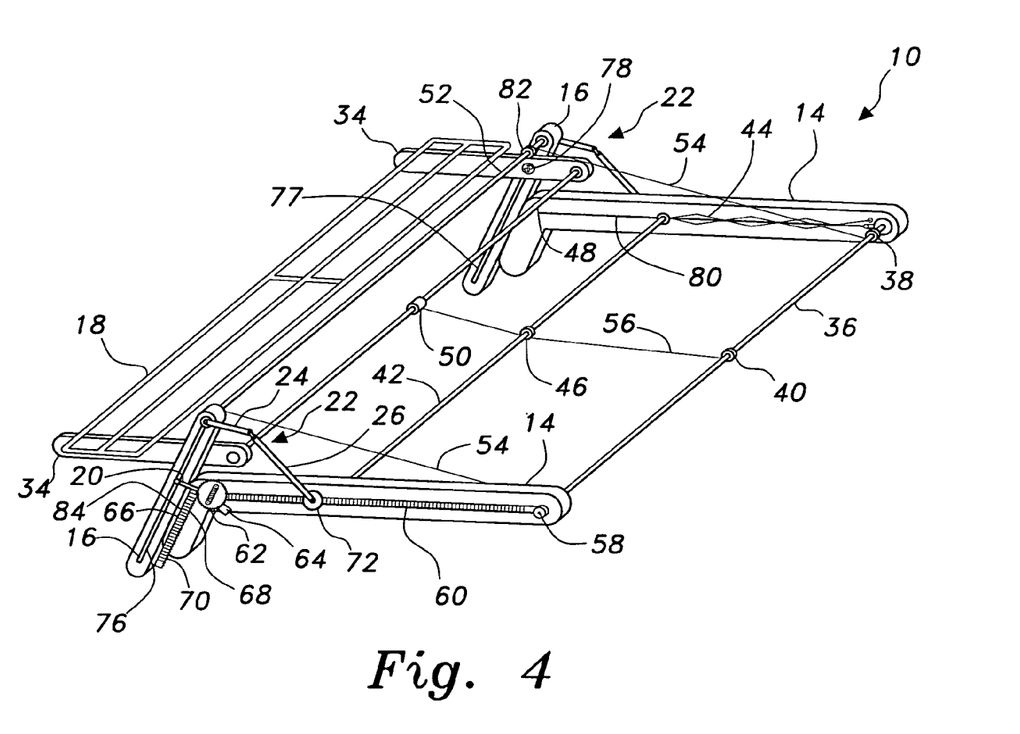
FIG. 4 is a perspective view of a motorized rack for a vehicle roof according to the present invention.
Figure 5A:
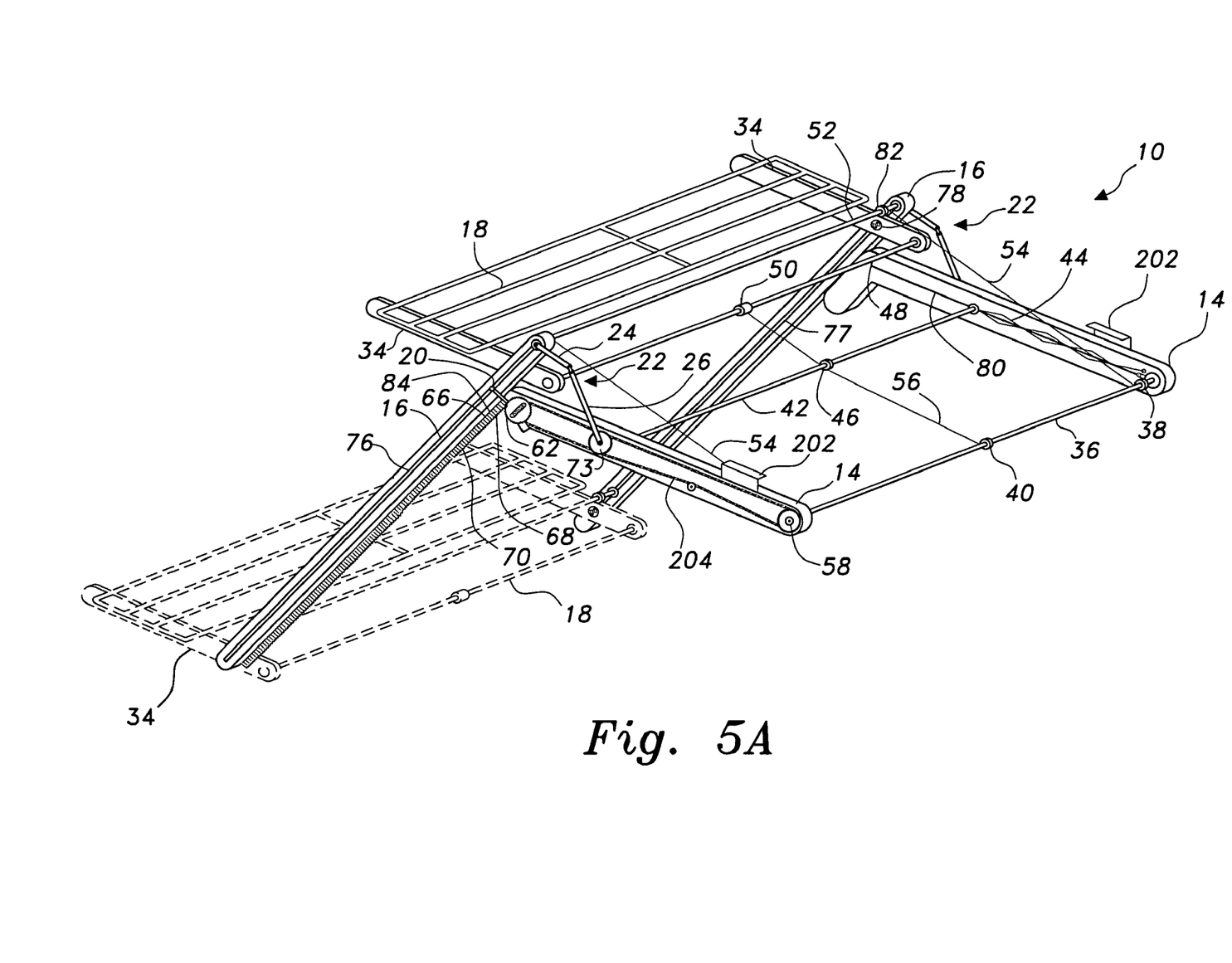
FIG. 5A is a perspective view of an alternative embodiment of the motorized rack for a vehicle roof.
Figure 5B:
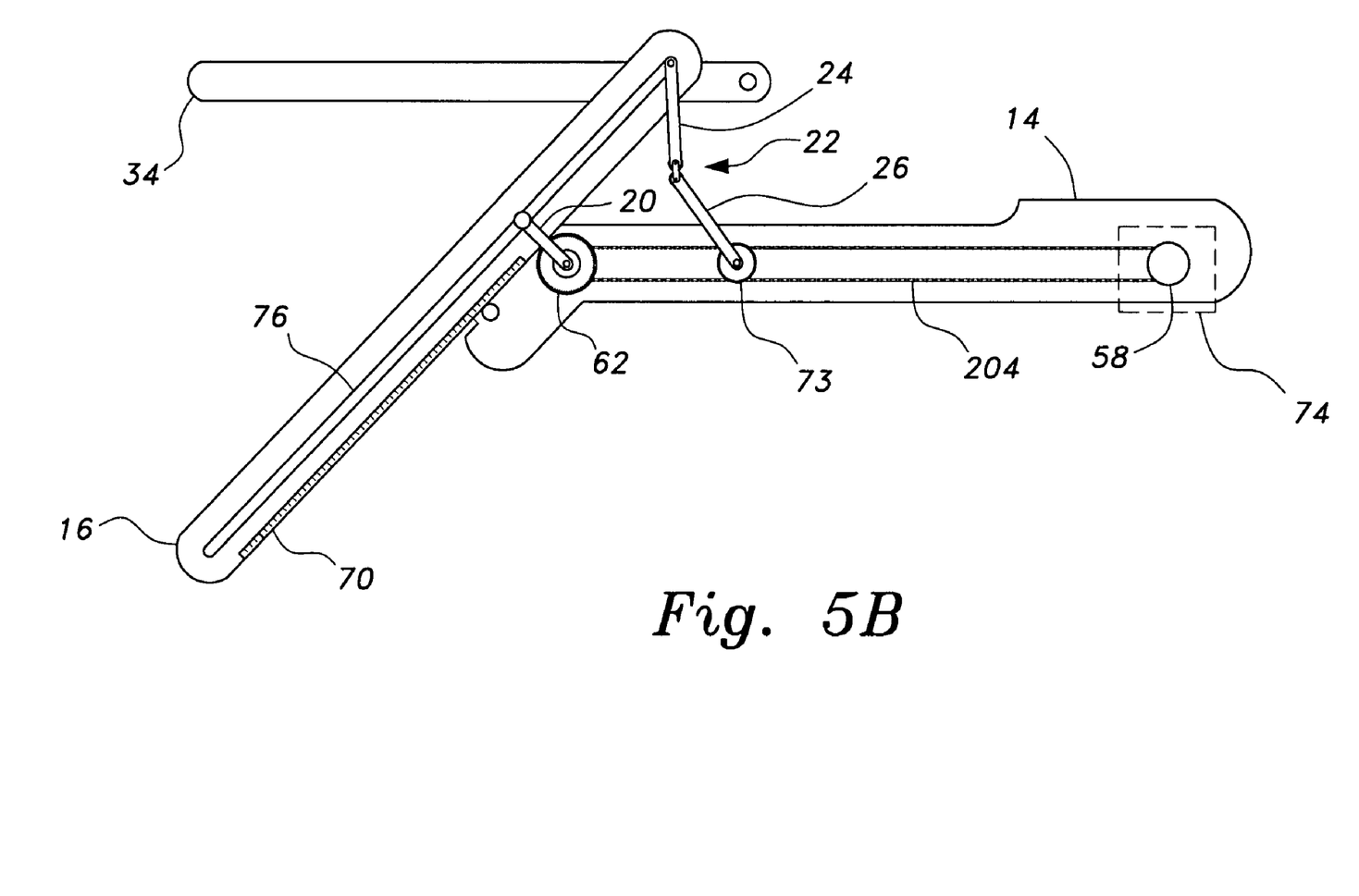
FIG. 5B is a side view of the embodiment of the motorized rack for a vehicle roof of FIG. 5A.

As shown in FIGS. 4 and 5B, a user-controlled motor 74 drives worm gear or worm wheel 58, which is mounted on the drive shaft 36 of motor 74. The motor 74 may be connected to the vehicle's internal power supply and have control switches mounted in any accessible location for allowing the driver of vehicle 12 to easily control motor function. Worm gears 58 are rotatably mounted to respective rear ends of the horizontal support frame members 14. The worm gears 58 are mounted on drive shaft 36, which is journaled through the horizontal support frame members 14. A central drive shaft wheel 40 is further positioned central to drive shaft 36. Worm gears 58 are in direct mechanical communication with motor 74, with the drive shaft 36 of motor 74 creating driven rotation in worm wheels 58.

Mounted longitudinally within each horizontal frame member 14 is a worm 60. Worm gear 58 engages worm 60 so that rotation of gear 58 on drive shaft 36 creates rotation in worm 60 in a substantially orthogonal direction to drive shaft 36. The traveling support arms 16 are driven by rack and pinion gears. Rotation of worm 60 drives pinion gears 62, which provide the motive force for deployment and retraction of the traveling support arms 16. Each traveling support arm 16 has a rack gear 70 mounted thereon that engages the respective pinion gear 62. Pinion gear 62 is rotationally mounted to a fixed point on one end of arm 14, and traveling arms 16 are driven horizontally by the rotation of pinion gears 62. A spring weight 64 is affixed to each pinion gear 62 and the respective horizontal support frame member 14 in order to bias pinion gear 62 with respect to horizontal support frame member 14. Spring-biased pinion gear 62 is thus restricted in its rotation, preventing accidental slippage and deployment of arm 16.

A traveling shaft 42 is positioned central to horizontal support frame members 14 and moves longitudinally therebetween. Opposing ends of traveling shaft 42 are mounted in slots or grooves 80, which are formed in horizontal support frame members 14. The traveling shaft 42 moves within slots or grooves 80. However, the movement is governed and controlled by collapsible drive armature 44, which is attached at a single point to the support frame member 14.

As shown in FIG. 4, the collapsible drive armature 44 is an accordion-like collapsible member, which limits the extent and rate of travel of traveling shaft 42, which moves within slots or grooves 80. Collapsible drive armature 44 is fixed at a single point along one end to arm 14, with an opposite moving end fixed to traveling shaft 42.

A support rack shaft 48 is mounted between rear ends of horizontal cargo carrier arms 34. A spring clutch 50 is positioned central to support rack shaft 48. As shown in FIG. 4, one end of a cable 56 engages spring clutch 50, with the opposed end being secured to central drive shaft wheel 40. Traveling shaft wheel 46 stabilizes cable 56 as the support rack 18, mounted on arms 34, is deployed and retracted.

Cargo carrier arms 34 each include a pivotal engagement member 78, which is slidable within a respective blind slot or groove 77 formed in the inner face of a respective traveling support arm 16. It should be noted that the pivotal connection between arm 20 and the support arm 16, as will be described in further detail below, slidably travels within blind slot 76, which is formed in the outer face of support arm 16. The pivotal engagement members 78, however, are slidably received within slots 77, which are formed on the inner face of each support arm 16, as shown. Motor 74 drives drive shaft 36, causing central drive shaft wheel 40 to rotate. This, in turn, controls tension in cable 56, which, via engagement with spring clutch 50, controls the sliding movement of arms 34 within slots 77. When equipment is to be loaded onto rack 18, the arms 34 are lowered with respect to arms 16, with the raising and lowering of the rack 18 being controlled by user-controlled motor 74.

A support shaft 52 is pivotally mounted between upper ends of traveling support arms 16. A pair of engagement wheels 82 are mounted on opposite ends of shaft 52 and are secured to cables 54. The opposite end of each cable 54 is secured to a respective one of opposed drive shaft wheels 38. As drive shaft 36 rotates under the power supplied by motor 74, tension in cables 54 allows traveling support arms 16 to be raised or lowered with respect to horizontal support frame members 14.

In the alternate embodiment shown in FIG. 5A, worm 60 is replaced with a driving chain 204, rotatably mounted on and stabilized by central gear 73. FIG. 5B illustrates a simplified side-view of this embodiment, including drive chain 204. FIG. 5A further shows, in dotted-line view, the lower position of rack 34 when rack 34 is driven to the lower position, which is configured for the loading and unloading of equipment at near-ground level. It should be noted that the shortened traveling support arms 16 shown in FIG. 4 are for illustrative purposes only.

Further shown in FIG. 5A are arm stopper members 202, which guide traveling support arms 16 when system 10 is in its stowed configuration, and also aid in stabilizing and holding support arms 16 in place during transport. Also, as shown best in FIG. 5A and as described above, pivotal engagement members 78 extend from horizontal rack arms 34 and are slidable in blind slots 77 defined in the inner faces of arms 16, preventing possible damage or snagging during operation of system 10.

In the embodiment shown in FIGS. 5A and 5B, the spring weight 64 of the embodiment of FIG. 4 is removed from biased pinion gear 62. Biased pinion gear 62 may be free to rotate or, alternatively, could be biased through any other suitable elastic devices.

In operation, in the embodiment shown in FIG. 4, the system 10 starts in the collapsed compact configuration shown in FIG. 1. Arms 16 are contoured to be received by the horizontal support frame members 14 in a space-efficient manner. User-controlled motor 74 drives worm gear 58 and drive shaft 36. Further, the rotation of worm gears 58 drives worms 60, which engage pinion gears 62. Rotation of pinion gears 62 creates forward horizontal movement of traveling support arms 16 with respect to frame member 14, as pinion gears 62 engage rack gears 70, mounted on each arm 16.

When each pinion gear 62 reaches the end 84 of respective rack 70, the arm 16 reaches a critical tipping point with respect to the horizontal frame member 14. Arm 16 rotates under its own weight with respect to frame member 14 to reach an angled configuration, as illustrated in FIG. 4. The arms 16 are supported in this angular state by the overhanging members of frame members 14, by cables 54 and also by arms 20 and 22. The rate of rotation of arm 16 and further vertical movement of arm 16 with respect to horizontal frame 14 are carefully controlled by cables 54, which link engagement wheels 82 with drive shaft wheels 38. As arms 16 are deployed, horizontal cargo carrier arms 34 are lowered with respect to traveling arms 16. Each rack arm 34 has a pivotal engagement member 78 projecting therefrom which slidably engages a blind slot or groove 77 formed in a respective arm 16. Descent of cargo carrier arms 34 is controlled by cable 56, which connects spring clutch 50 with central drive shaft wheel 40.

First pivotal arm member 20 is mounted on one end to the axle of pinion gear 62. The other end of member 20 is slidably received within blind slot or groove 76. Similarly, second pivoting arm member 22 is mounted on one end to a central gear 72, which is rotatably mounted to horizontal support frame member 14 and driven by worm 60, and the opposite end is received within slot 76 of arm 16. Pivotal arm members 20 and 22 allow for guided smooth movement and support of arms 16 with respect to frame members 14. Worm 60 engages gear 72 in a similar manner to the engagement of pinion gear 62, described above, so that rotation of worm 60 about the horizontal axis creates rotation of pinion gear 62 about a substantially orthogonal axis. This rotation in pinion gear 62 causes arm 26 to pivot, which, in turn, drives rotation of arm 24 through the interconnection of gears 28 and 30, shown in FIG. 3. The driven rotation of arms 24 and 26 of arm 22 allows for the smooth folding and unfolding of arm 22, which provides a controlled and smooth lowering and ascension of arms 16 with respect to support frame members 14.

Referring to FIG. 4, a first magnetic element 66 is mounted on each support arm 16 and a corresponding second magnetic element 68 is mounted on each frame member 14. First and second magnetic elements 66 and 68 form a magnetic switch, which is in electrical communication with motor 74. When arm 16 is fully deployed with respect to frame member 14, the magnetic switch shuts off power to motor 74, ceasing any further downward movement. It should be noted that a separate motor 74 may be provided for each horizontal support frame member 14, allowing the deployment and retraction of arms 16 to be individually controlled, with a split drive shaft and suitable clutch. If vehicle 12 is parked on a graded surface, for example, the arms 16 could be independently controlled to maintain rack 18 at a horizontal level.

Figure 6:
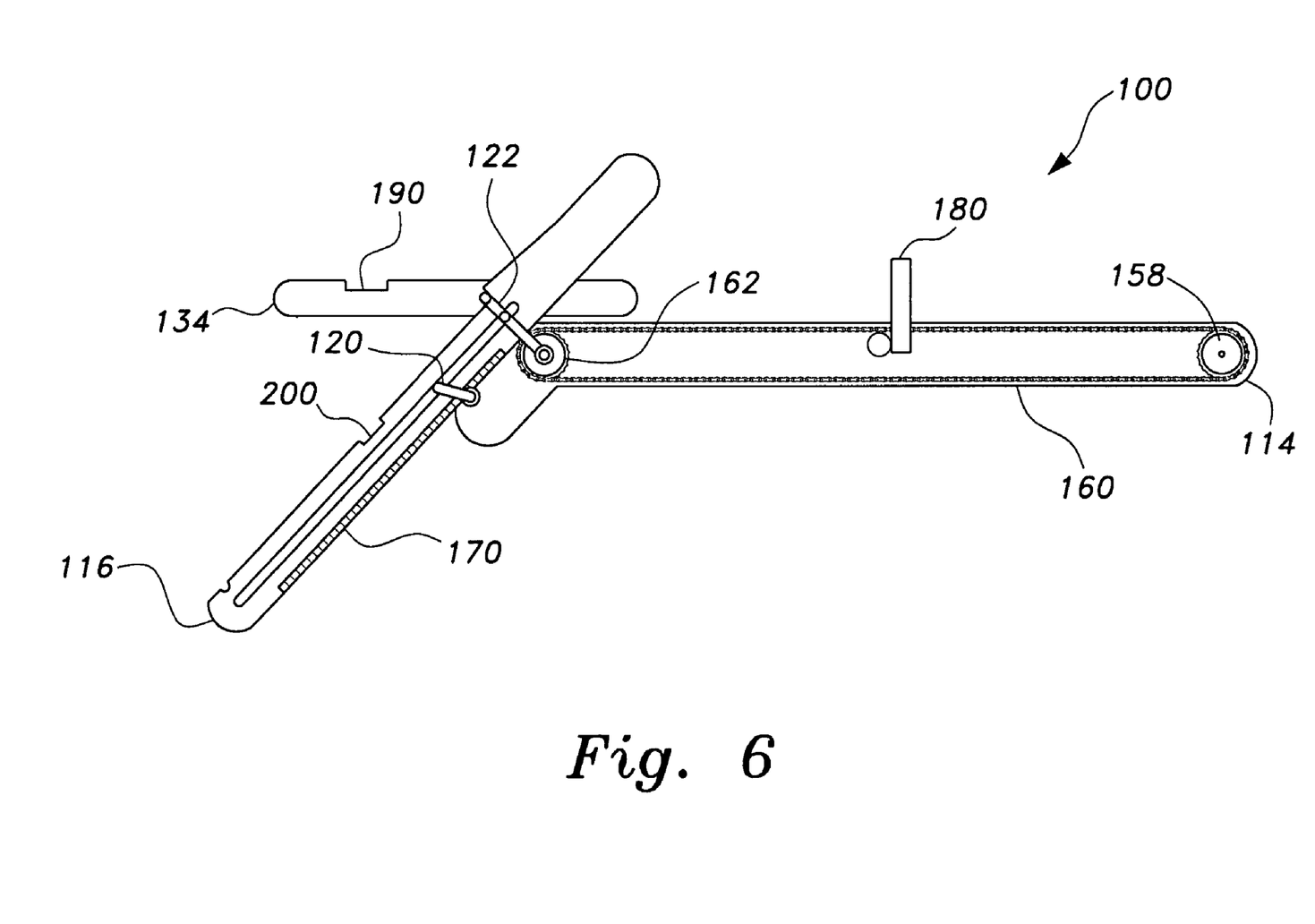
FIG. 6 is a side view of another alternate embodiment of a motorized rack for a vehicle roof according to the present invention.

FIG. 6 illustrates an another alternative embodiment of the present invention. Motorized lift for a vehicle roof rack 100 includes horizontal support frame members 114 and traveling support arms 116, similar to members 14 and arms 16 of the embodiment illustrated in FIGS. 1-5B. The embodiment of FIG. 6 further similarly includes traveling support deployment gear 162, first and second pivoting arm members 120 and 122 and horizontal rack arms 134.

In the embodiment of FIG. 6, the worm 60, of the embodiment of FIG. 4, is replaced with a chain and sprocket mechanism, similar to the embodiment of FIG. 5A. Driving sprocket 158 causes chain 160 to rotate, thus driving pinion gear 162, which engages rack gear 170. However, in the embodiment of FIG. 6, a clamping member 180 is mounted to horizontal support frame members 114. Clamping member 180 engages notches 190 and 200 formed in arms 134 and 116, respectively, when the system 100 is in a collapsed, stowed position. During travel, the engagement of clamping member 180 with notches 190 and 200 securely maintains the system in its collapsed configuration. Further, the gear 73 of the embodiment of FIGS. 5A and 5B is removed in the embodiment of FIG. 6, providing simplified control over the deployment of arms 116.

Figure 7:
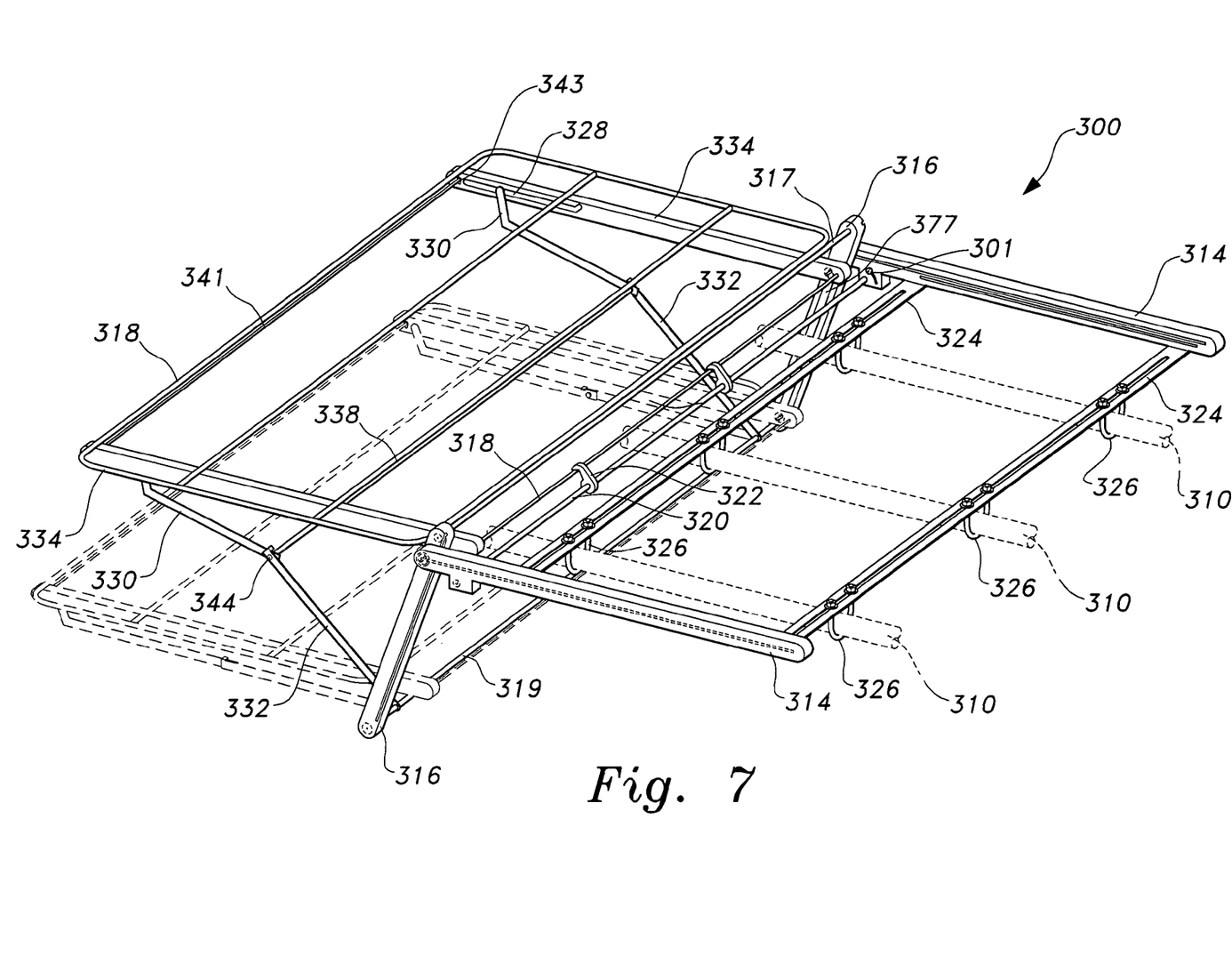
FIG. 7 is a perspective view of an alternative embodiment of a rack for a vehicle roof according to the present invention that is manually operated.

FIG. 7 illustrates an alternative embodiment of a rack for a vehicle roof, designated generally as 300 in the drawings, that is manually operated. That is, the motor and drive system of the embodiments of FIGS. 1-6 have been removed, allowing the user to deploy and stow the rack 300 by hand without external drive means. In FIG. 7, rack 300 is shown as being attached to mounts 310, which are fixed to the roof of vehicle 12 in a conventional manner. The rack 300 is attached to the mounts 310 by U-bolts 326, which are fastened to crossbars 324 extending between horizontal support frame members 314.

Horizontal support frame members 314 are similar to horizontal support frame members 14, as described above, except that members 314 do not carry drive means, as will be described in further detail below. Further, rack 300 includes traveling support arms 316, which are pivotally and slidably joined to the horizontal support frame members 314, and horizontal cargo carrier arms 334, which are pivotally and slidably joined to traveling support arms 316 via engagement with slots 377 of arms 316, in a manner similar to that described above with regard to the embodiment of FIG. 4.

Horizontal cargo carrier arms 334 support cargo carrying rack 318, which is shown held in an intermediate deployment position extended from the roof but not yet lowered in solid-lines in FIG. 7, through the engagement of hook members 322 and first rod 318. Hook members 322 are pivotally mounted on second rod 320, thus maintaining first rod 318 in a substantially horizontal position at the pivot point. In order to deploy rack 300 into the lower position (shown in dashed lines in FIG. 7), the user first pulls bar 338 downwardly, thus driving the rack 300 into the lowered position (shown in dashed lines in FIG. 7). Further, actuating members 301 allow the user to rotate the hook members 322 from the engaged position (shown in FIG. 7) to a disengaged position (wherein the hook members 322 no longer engage first rod 318, and the system is able to be collapsed into its storable and transportable state). This rotation further coincides with the movement of arms 316 into the horizontal, or collapsed, position.

Rather than driving and controlling the movement of horizontal cargo carrier arms 334 through external power, as described above, the movement of cargo carrier arms 334 is user-powered, controlled and stabilized by forward support arm 330 and rear support arm 332, which are pivotally joined to one another at 344 to form articulated stabilizer arms. Each horizontal cargo carrier arm 334 has a set of forward and rear support arms 330, 332 associated therewith, and each set of support arms is joined to the other by central rod 338, as shown.

Figure 8:
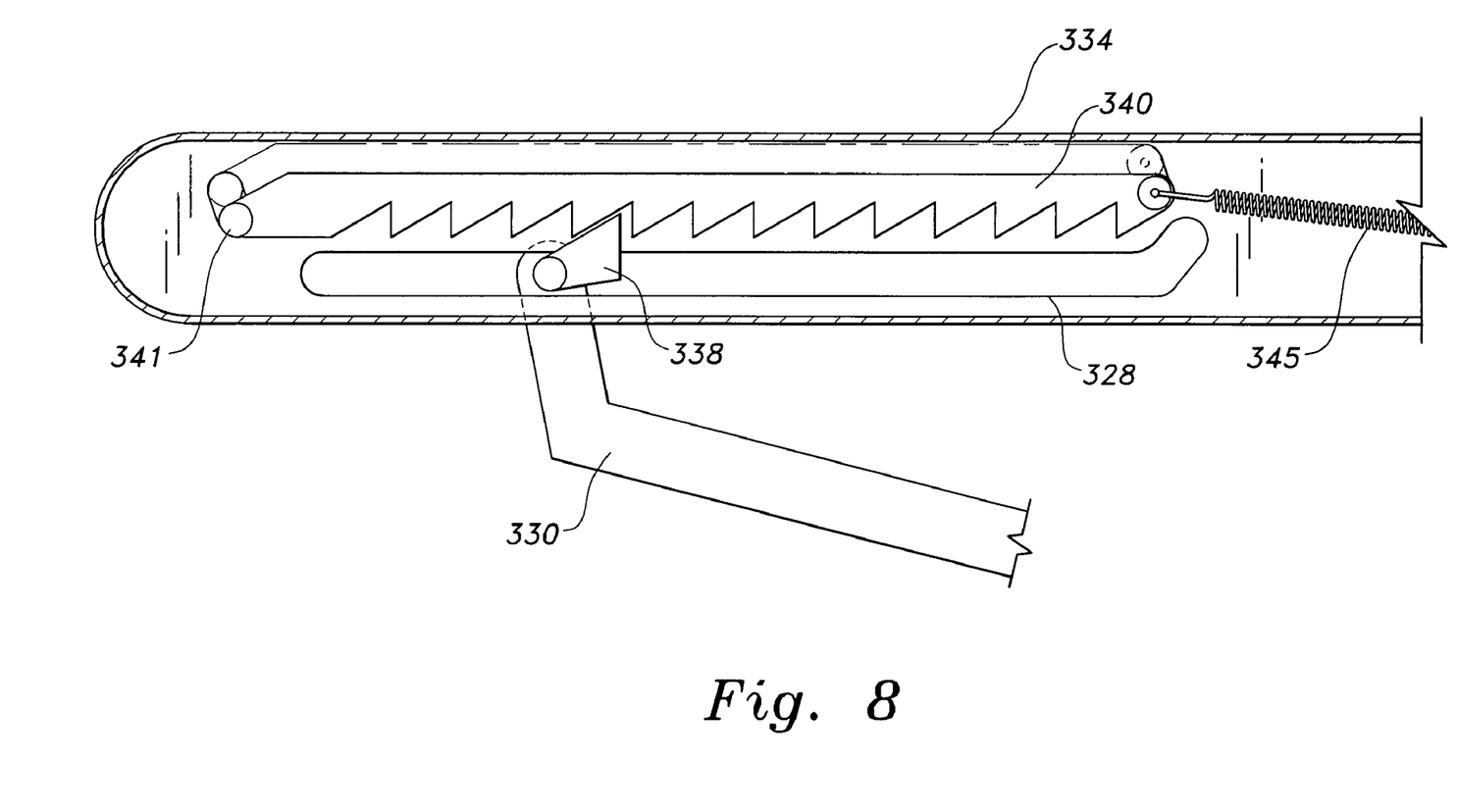
FIG. 8 is a partial, side view in section of a cargo carrier arm of the rack of FIG. 7 showing a ratchet mechanism for controlling deployment of the articulated stabilizer arms.

The lower end of each rear support arm 332 is pivotally secured to lower rod 319, and the upper end is pivotally joined to a respective lower end of one of forward support arms 330. As shown in FIG. 8, an elongated, linear, fixed ratchet member 340 is movably mounted within each horizontal cargo carrier arm 334, and is engaged by a pawl 338. Pawl 338 is pivotally joined to the upper end of each forward support arm 330 and is spring-biased to engage the teeth of ratchet member 340, and the releasable and adjustable engagement of pawl 338 with ratchet member 340 allows the user to control the deployment of rack 318, and also to lock the position of forward arm 330 with respect to the horizontal cargo carrier arm 334.

When the cargo carrying rack 318 is fully retracted onto the roof of the vehicle, pawl 338 is positioned to the far right of the ratchet member 340 of FIG. 8. As the cargo carrying rack 318 is extended from the roof, the pawl 338 ratchets to the left. The pawls 338 are released by a release mechanism when retracting the cargo carrying rack 318 back onto the roof. As illustrated in FIGS. 7 and 8, the upper end of each forward arm 330 is pivotally and slidably connected to the respective horizontal cargo carrier arm 334 through pivot pin extending through a slot 328 formed therethrough.

Further, as shown in phantom in FIG. 8, ratchet member 340 may move upwardly, allowing the pawl 338 to easily be adjusted in the horizontal direction. In order to raise the ratchet member 340, the user lifts rod 341, which, as shown in FIG. 7, extends between carrier arms 334, and is received therein through respective openings 343. Each end of rod 341 is joined to the forward end of one of ratchet members 340, allowing the ratchet member to be selectively raised. The rearward end of each ratchet member 340 is joined to a spring 345, which biases ratchet member 340 to return the ratchet member 340 to its lower, locked position.

Figure 9:
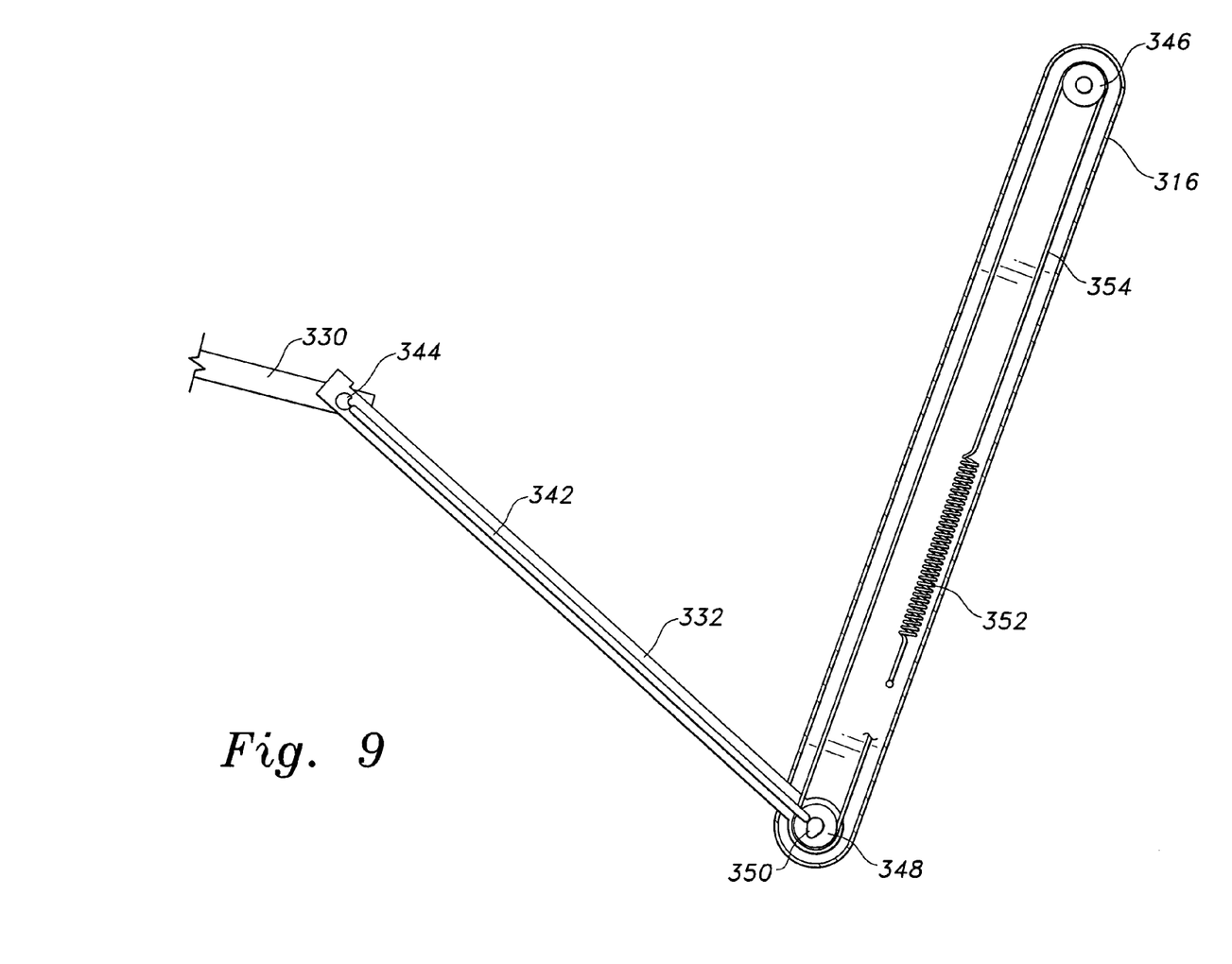
FIG. 9 is a partial, side view in section of a traveling support arm of the rack of FIG. 7 showing a spring-biased pulley mechanism for dampening the speed of deployment of the cargo carrying rack.

Further, as shown in FIG. 9, the movement of horizontal cargo carrier arms 334 with respect to arms 316 may be controlled and stabilized by a pulley system mounted within each arm 316. Upper pulley wheels 346 are pivotally mounted to axle 317 (shown in FIG. 7) and lower pulley wheels 348 are mounted to lower rod 319 (shown in FIG. 7). A cable 354 extends around pulley wheels 346, 348. Cable 354 may have one end attached to a spring 352, the spring 352 having its opposite end attached to an anchor pin extending from the interior surface of arm 316. The opposite end of cable 354 may also be attached to the anchor pin. Alternatively, the opposite end of cable 354 is joined to pulley wheel 348, rather than to an anchor pin, allowing for optimal torque of wheel 348 for driving eccentric cam 350, as will be described below.

The pulley mechanism dampens the speed of deployment of cargo carrying rack 318 when the rack 318 is extended from the roof to prevent a rapid, unwanted descent of the cargo carrying rack 318. It should be noted that cam 350 does not rotate with respect to wheel 348. Cam 350 is fixed with respect to wheel 348, with wheel 348 and cam 350 rotating together in a unitary fashion.

It is to be understood that the present invention is not limited to the embodiments described above, but encompasses any and all embodiments within the scope of the following claims.

I claim:

1. A rack for a vehicle roof, comprising:
   a pair of horizontal support frame members rigidly mounted to the roof of the vehicle;
   a pair of traveling support arms, each of the traveling support arms releasably engaging a respective one of the horizontal support frame members;
   a cargo carrying rack for supporting equipment, the cargo carrying rack being slidably mounted on the pair of traveling support arms;
   a pair of horizontal cargo carrier arms, said cargo carrying rack being mounted on the pair of horizontal cargo carrier arms;
   a first rod mounted to, and extending between, the pair of horizontal cargo carrier arms, the first rod being positioned between respective rear ends of the pair of horizontal carrier arms;
   a second rod mounted to, and extending between, the pair of horizontal support frame members; and
   at least one hook member pivotally mounted on the second rod, the at least one hook member selectively engaging the first rod to releasably and selectively lock the first rod to the second rod;
   a lower axle pivotally mounted to, and extending between, respective lower ends of said pair of traveling support arms;
   a pair of rear support arms, each of the rear support arms having opposed forward and rear ends, the rear end of each of the rear support arms being pivotally mounted to said lower axle adjacent a respective one of said traveling support arms; and
   a pair of forward support arms, each of the forward support arms having opposed forward and rear ends, the rear end of each of the forward support arms being pivotally joined to the forward end of a corresponding one of the rear support arms, the forward end of each of the forward support arms being slidably mounted to a respective one of said horizontal cargo carrier arms;
   wherein a user controls the lowering and raising of the traveling support arms and the cargo carrying rack, whereby the user may easily load or unload the equipment onto the cargo carrying rack and control lifting of the cargo carrying rack to safely and securely store the equipment on the roof of said vehicle.

2. The rack for a vehicle roof as recited in claim 1, further comprising a pair of elongated linear ratchet members, each of the ratchet members being mounted within a respective one of said horizontal cargo carrier arms, each of said forward support arms having a pawl pivotally attached thereto selectively engaging teeth defined in the ratchet member.

3. The rack for a vehicle roof as recited in claim 2, further comprising an upper axle pivotally mounted to, and extending between, respective upper ends of said pair of traveling support arms.

4. The rack for a vehicle roof as recited in claim 1, further comprising at least one elongated support member mounted to, and extending between, said pair of horizontal support frame members.

5. The rack for a vehicle roof as recited in 4, further comprising means for securing said at least one elongated support member to the vehicle roof.

6. The rack for a vehicle roof as recited in claim 1, further comprising motorized drive means for providing user-controllable drive for selective deployment of said cargo carrying rack.

7. A rack for a vehicle roof, comprising:
   a pair of horizontal support frame members rigidly mounted to the roof of the vehicle;
   a pair of traveling support arms, each of the traveling support arms releasably engaging a respective one of the horizontal support frame members;
   a cargo carrying rack for supporting equipment, the cargo carrying rack being slidably mounted on the pair of traveling support arms, wherein the user controls the lowering and raising of the traveling support arms and the cargo carrying rack, whereby the user may easily load or unload the equipment onto the cargo carrying rack and control lifting of the cargo carrying rack to safely and securely store the equipment on the roof of said vehicle;

a pair of horizontal cargo carrier arms, said cargo carrying rack being mounted on the pair of horizontal cargo carrier arms;

a first rod mounted to, and extending between, the pair of horizontal cargo carrier arms, the first rod being positioned between respective rear ends of the pair of horizontal carrier arms;

a second rod mounted to, and extending between, the pair of horizontal support frame members;

at least one hook member pivotally mounted on the second rod, the at least one hook member selectively engaging the first rod to releasably and selectively lock the first rod to the second rod;

a lower axle pivotally mounted to, and extending between, respective lower ends of said pair of traveling support arms;

a pair of rear support arms, each of the rear support arms having opposed forward and rear ends, the rear end of each of the rear support arms being pivotally mounted to said lower axle adjacent a respective one of said traveling support arms;

a pair of forward support arms, each of the forward support arms having opposed forward and rear ends, the rear end of each of the forward support aims being pivotally joined to the forward end of a corresponding one of the rear support arms, the forward end of each of the forward support arms being slidably mounted to a respective one of said horizontal cargo carrier arms;

a pair of elongated linear ratchet members, each of the ratchet members being mounted within a respective one of said horizontal cargo carrier arms, each of said forward support arms having a pawl pivotally attached thereto selectively engaging teeth defined in the ratchet member;

an upper axle pivotally mounted to, and extending between, respective upper ends of said pair of traveling support arms;

a pair of upper pulley wheels mounted within the respective upper ends of said traveling support arms, respectively, the upper pulley wheels being mounted for rotation on said upper axle;

a pair of lower pulley wheels mounted within respective lower ends of said traveling support arms, respectively the lower pulley wheels being mounted for rotation on said lower axle; and cables mounted on the upper and lower pulley wheels, respectively.

8. The rack for a vehicle roof as recited in claim 7, further comprising springs mounted within said traveling support arms, respectively, the springs having first ends anchored to said traveling support arms and second ends attached to an end of said cables, respectively.

9. The rack for a vehicle roof as recited in claim 8, further comprising:

a pair of eccentric cams mounted to said lower rod adjacent a respective one of said rear support arms;

a pair of sliding arms slidably mounted on a respective one of said rear support arms, the sliding arms having forward ends and rear ends, the rear end of each of the sliding arms engaging a respective one of the eccentric cams; and a pair of pivot pins, each of the pivot pins pivotally joining one of said rear support arms to a respective one of said forward support arms, the forward end of each of the sliding arms releasably and lockingly engaging a respective one of the pivot pins.

* * * * *